March 25, 1947.  A. SIMMON  2,418,107
CAMERA VIEW AND RANGE FINDER
Filed April 29, 1944  13 Sheets-Sheet 1

Alfred Simmon
INVENTOR.

BY Walter E. Wollheim
ATTORNEY.

Alfred Simmon
INVENTOR.

BY Walter E. Wollheim
ATTORNEY.

Alfred Simmon
INVENTOR.

BY Walter E. Wollheim
ATTORNEY.

March 25, 1947.    A. SIMMON    2,418,107
CAMERA VIEW AND RANGE FINDER
Filed April 29, 1944    13 Sheets-Sheet 4
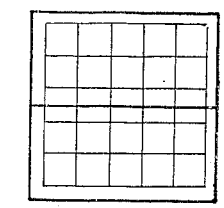
Fig:12
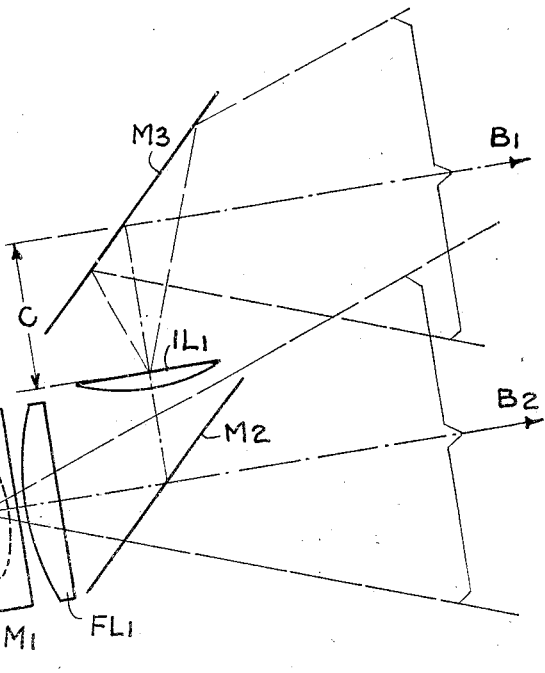
Fig:10
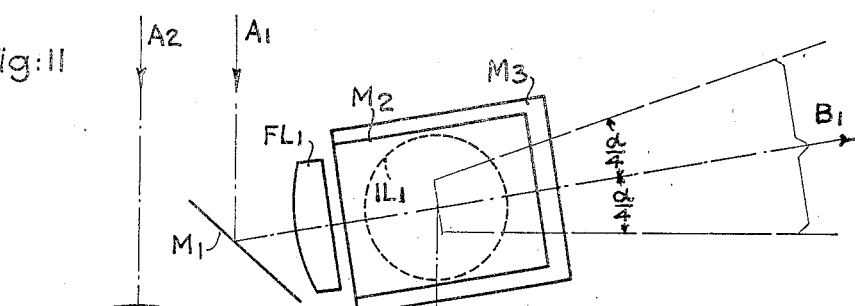
Fig:11
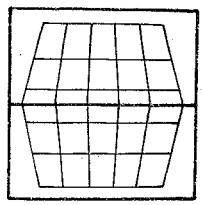
Fig:13
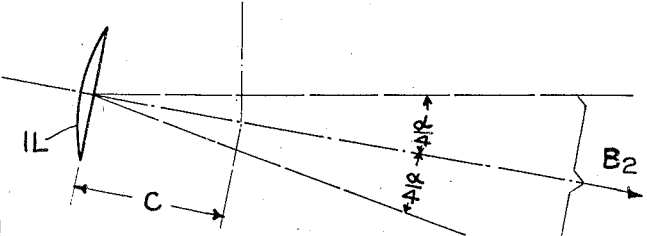
Alfred Simmon
INVENTOR.
BY *Walter E. Wallheim*
ATTORNEY.

March 25, 1947. A. SIMMON 2,418,107
CAMERA VIEW AND RANGE FINDER
Filed April 29, 1944 13 Sheets-Sheet 5
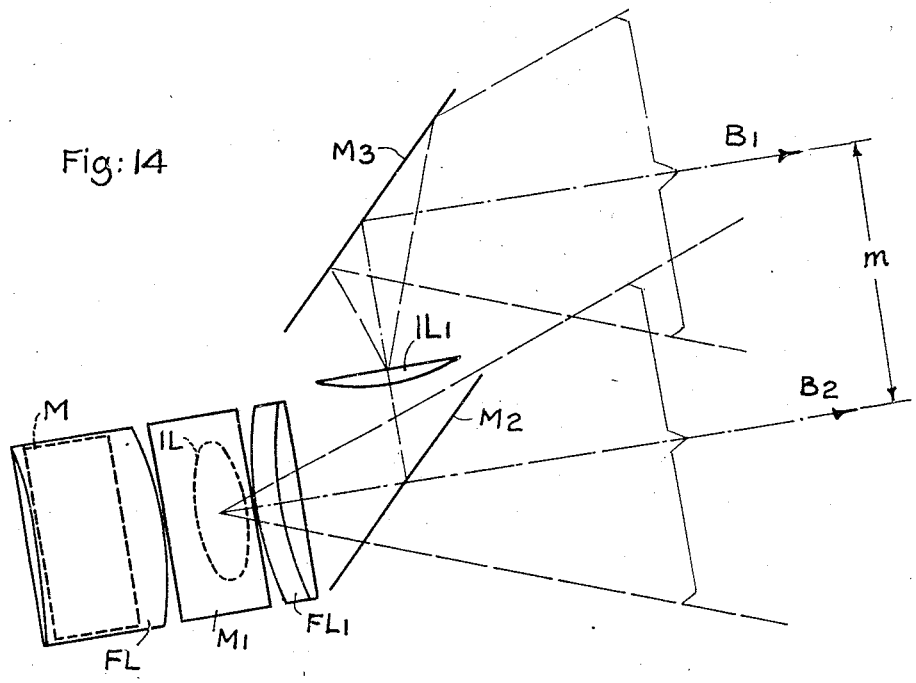
Fig: 14
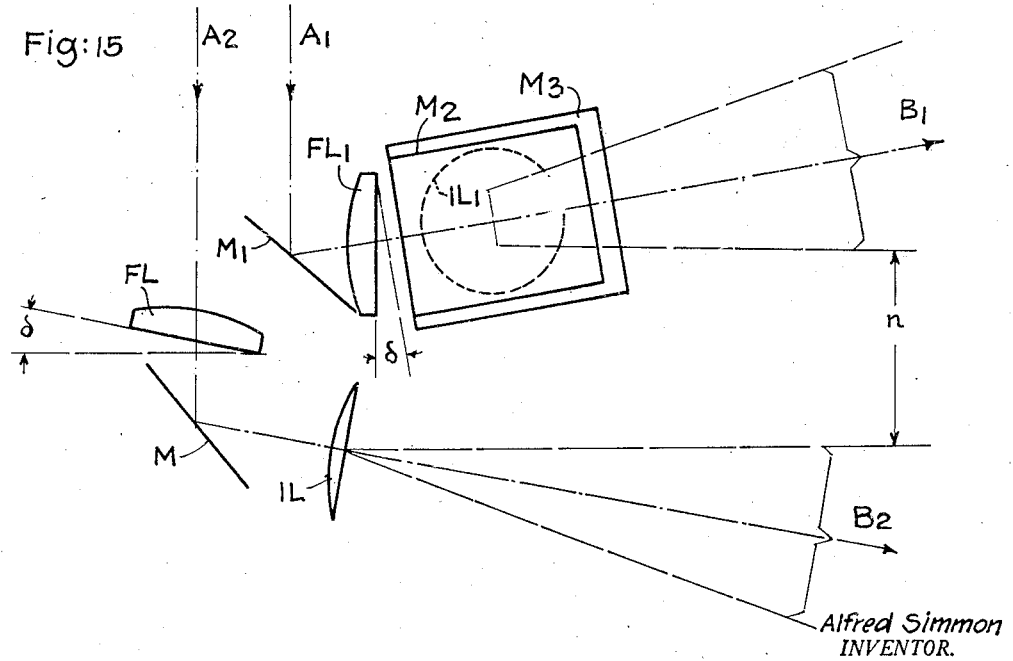
Fig: 15
Alfred Simmon
INVENTOR.
BY Walter E. Wollheim
ATTORNEY.

March 25, 1947.　　　A. SIMMON　　　2,418,107
CAMERA VIEW AND RANGE FINDER
Filed April 29, 1944　　　13 Sheets-Sheet 6
Fig.:16
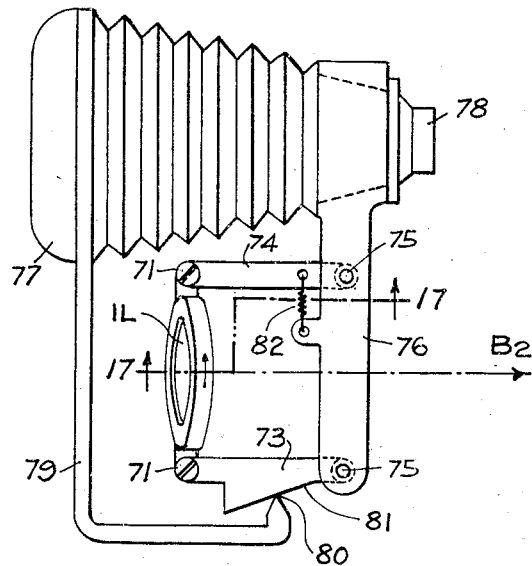
Fig.:17
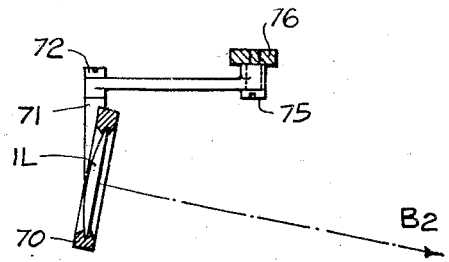
Alfred Simmon
INVENTOR.
BY Walter E. Wollheim
ATTORNEY.

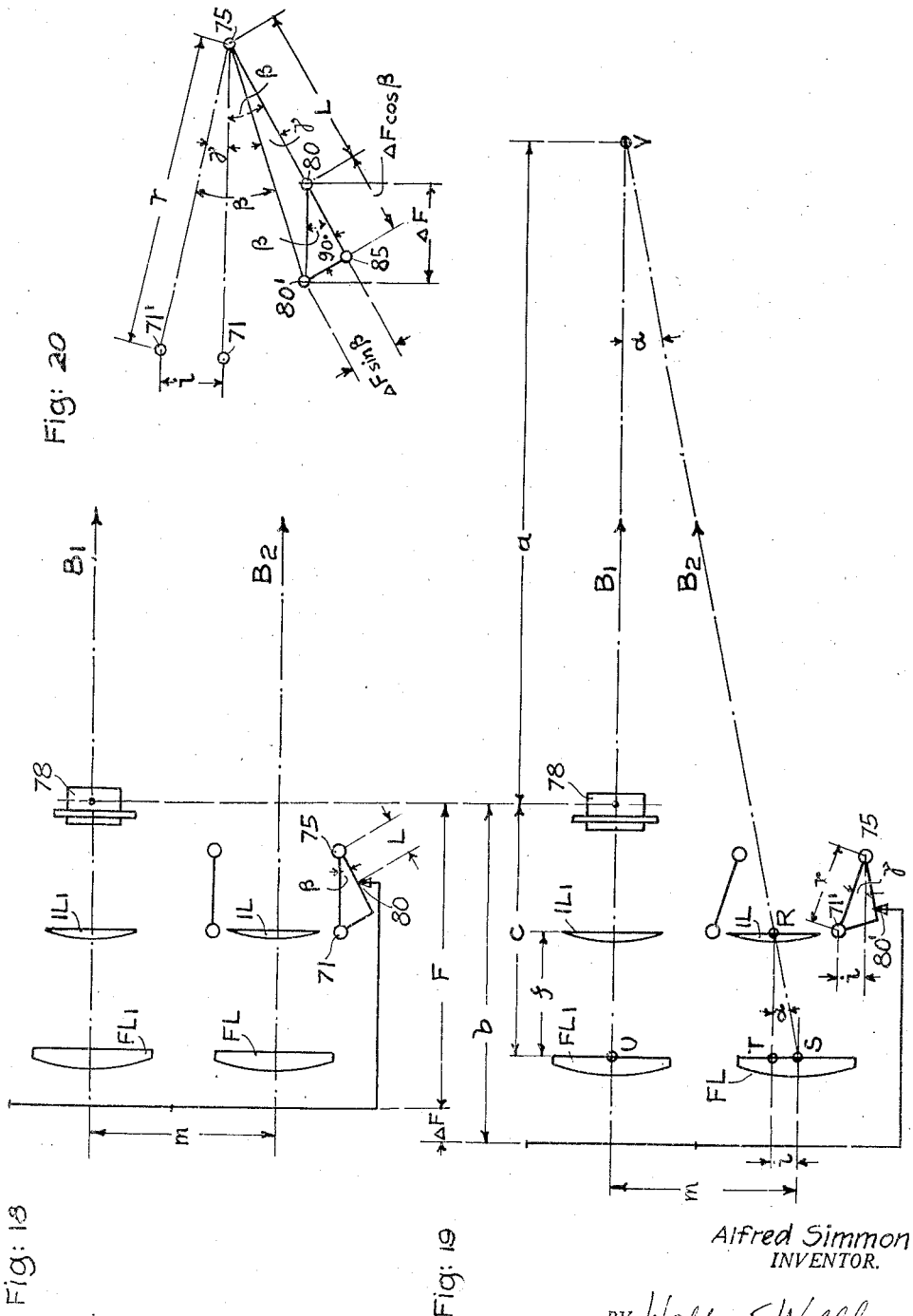

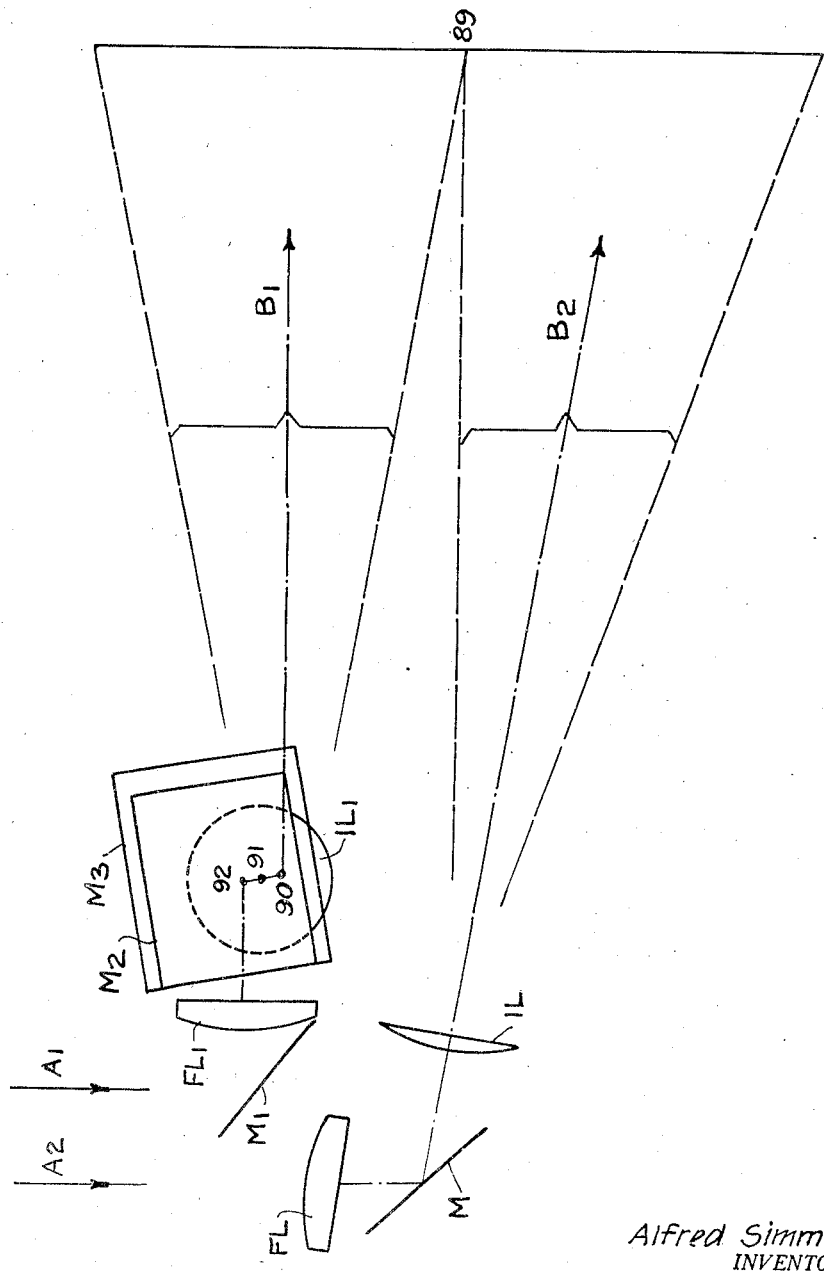

March 25, 1947.  A. SIMMON  2,418,107
CAMERA VIEW AND RANGE FINDER
Filed April 29, 1944  13 Sheets-Sheet 9
Fig: 22
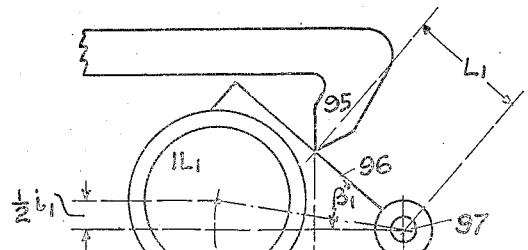
Fig: 23
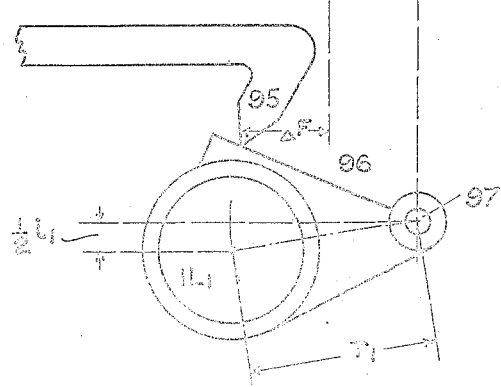
Fig: 24  Fig: 25  Fig: 26
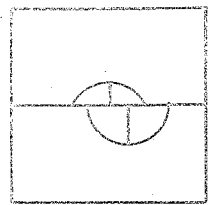 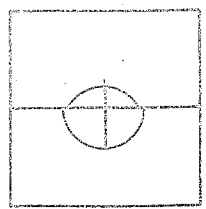 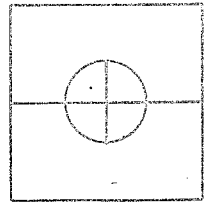
Alfred Simmon
INVENTOR.
BY Walter E. Wallheim
ATTORNEY.

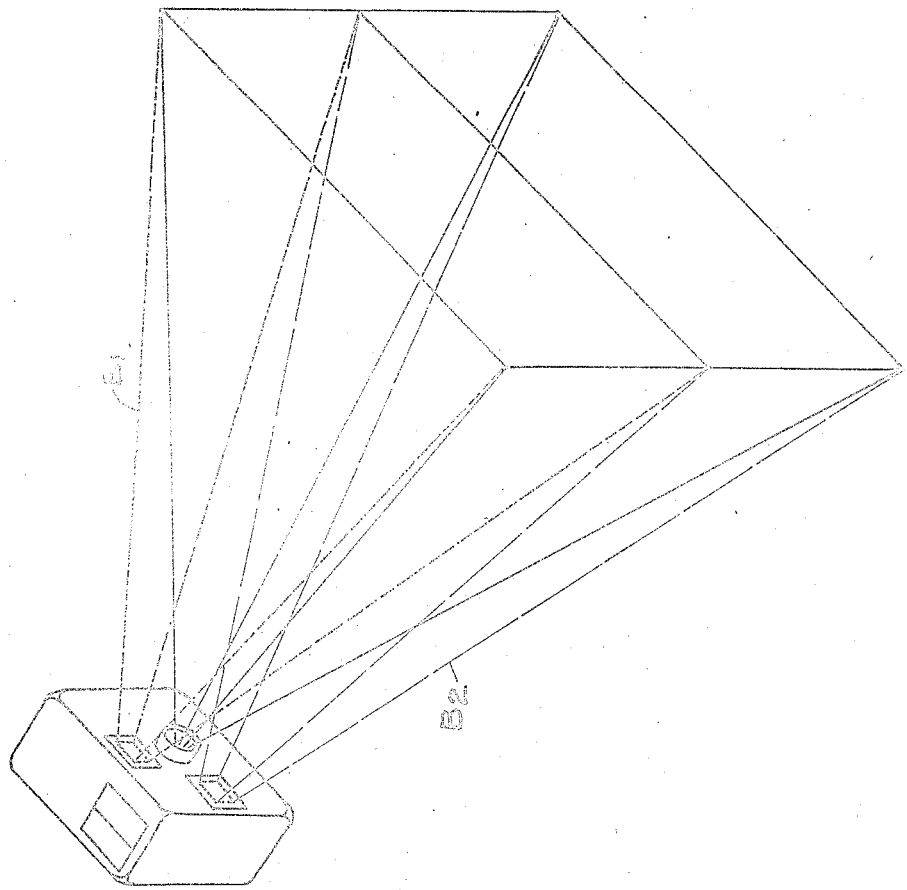

March 25, 1947.  A. SIMMON  2,418,107
CAMERA VIEW AND RANGE FINDER
Filed April 29, 1944   13 Sheets-Sheet 11

Alfred Simmon
INVENTOR.

BY Walter E. Wallheim
ATTORNEY.

Fig:30
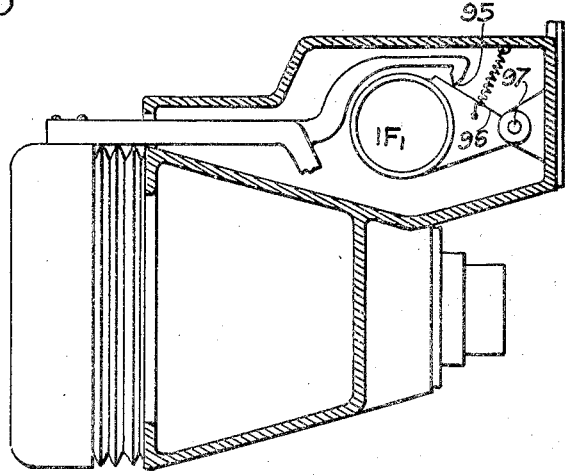
Fig:31
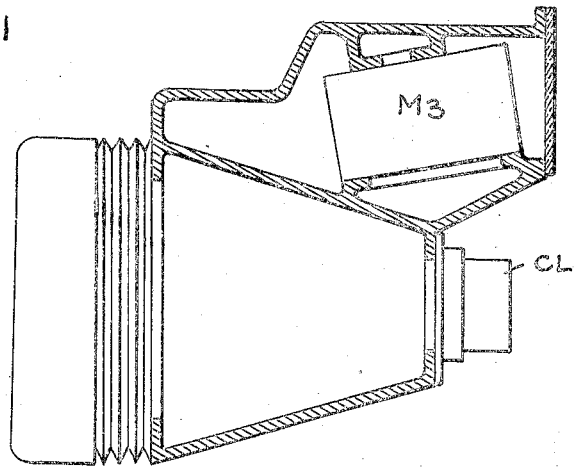

March 25, 1947.  A. SIMMON  2,418,107
CAMERA VIEW AND RANGE FINDER
Filed April 29, 1944   13 Sheets-Sheet 13

Alfred Simmon
INVENTOR.

BY Walter E. Wollheim
ATTORNEY.

UNITED STATES PATENT OFFICE 2,418,107

CAMERA VIEW AND RANGE FINDER

Alfred Simmon, Jackson Heights, N. Y., assignor to Simmon Brothers, Inc., Long Island City, N. Y., a corporation of New York Application April 29, 1944, Serial No. 533,271

30 Claims. (Cl. 95—44)

This invention pertains to a camera view and range finder of the so-called "brilliant" type.

A view finder of this so-called "brilliant" type consists of a large, usually square or rectangular, field lens arranged in a substantially horizontal plane, a 45° mirror underneath this field lens and an image forming lens in front of this mirror, this arrangement adapted to be viewed with both eyes from a convenient reading distance, i. e., approximately 10". The image forming lens IL projects an image of the object to be photographed into the plane of the field lens FL and the focal length of this image forming lens must, of course, be so chosen that it covers approximately the same field as a camera lens.

The forwardly inclined mirror M not only changes the direction of the light beam but acts as an image erecting element so that the observer sees an upright, although still laterally inverted, image.

The field lens projects an enlarged image of the image forming lens into a plane containing the eyes of the observer. This image may be either real or virtual. As long as both eyes of the observer stay within the area covered by this image they will see the view presented by the finder simultaneously and it is, of course, desirable to make this area larger than strictly necessary so that the observer may move his head slightly in any direction and still be able to see the view finder image with both eyes. View finders which must be held closely to one eye of the observer and which comprise telescopes of some kind are specifically excluded by this definition of a "brilliant" view finder. The "brilliant" finder thus described is in many respects the most satisfactory camera finder yet devised.

Any view finder can be converted into a range finder by splitting its image and by introducing a certain amount of parallaxis between the two part images. For objects closer than infinity the two part images will then be out of register but by adjusting at least one of the optical elements in at least one of the part image systems, coincidence can be restored, and the amount of adjustment necessary for this purpose is a measure of the distance of the object from the camera. Preferably this adjustment is connected with the focusing movement of the camera lens so that a given object is focused sharply on the film whenever the two parts of its split image in the range finder field are in register. Attempts to modify a "brilliant" finder accordingly have met with difficulties which can be traced to the failure of these finders to meet one or several of the following conditions.

These conditions are:

1. The finder must not require excessively large reflecting surfaces.

2. The parting line between the two part images shall divide the view finder image into two substantially equal parts. The combination of a large view finder image having a small cutout only for the second part image for range finding purposes is very impractical since it becomes exceedingly difficult to locate the vital part of the picture on which the photographer wishes to focus. The parting line should be as stationary as possible, unaffected in its shape and position by small movements of the head of the observer, and one eye shall always see the parting line in the same shape and position with respect to the view finder image as the other eye.

3. The finder image shall be as large as possible and shall be visible to both eyes of the observer from a reasonably large area. This means image forming lenses of large diameter, and large field lenses of short focus, but in spite of this, aberrations, in particular barrel shaped distortion, must be kept at a minimum.

4. Both pencils of rays forming the two part images, respectively, must be of exactly the same length, otherwise the scale of reproduction for two respective part images of a given object cannot be exactly the same at all distances, and this would introduce errors so large as to make the range finder useless.

5. The two part images shall always represent supplementing parts of the image of the object to be photographed. As will become apparent later, separate means may be necessary to solve this problem, depending upon whether we deal with objects at a large distance, at infinity or near it, or with relatively close objects.

6. The beam deviating device, i. e., the device to deviate at least one beam in order to restore register between the part images shall be simple and capable of being manufactured with a high degree of accuracy, so that the focusing movement of the camera lens and the range finder adjustment may be synchronized with accuracy and certainty.

7. Means shall be provided to compensate for parallaxis between the view finder image and the field covered by the camera lens.

8. While, as has been pointed out above, the head of the observer may be moved within a certain area without undue consequences, it will, nevertheless, be desirable to provide some indication for the operator showing him whether his head is still in this area.

My invention provides means to meet these conditions. These means shall be described substantially in the order indicated.

Figure 5:
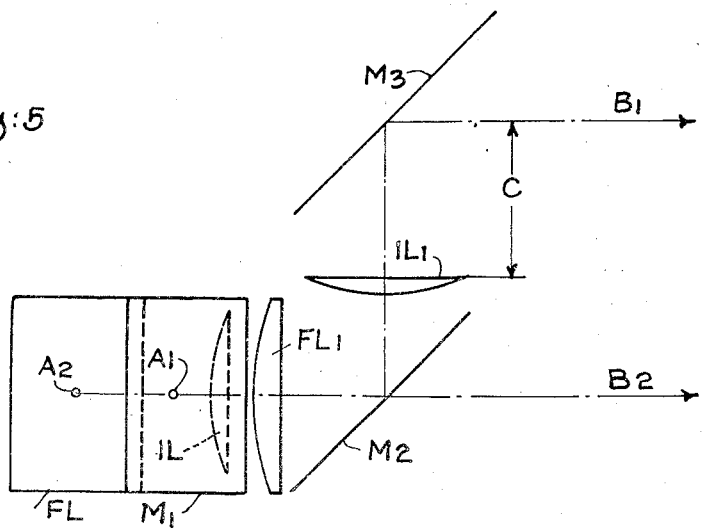
Figure 6:
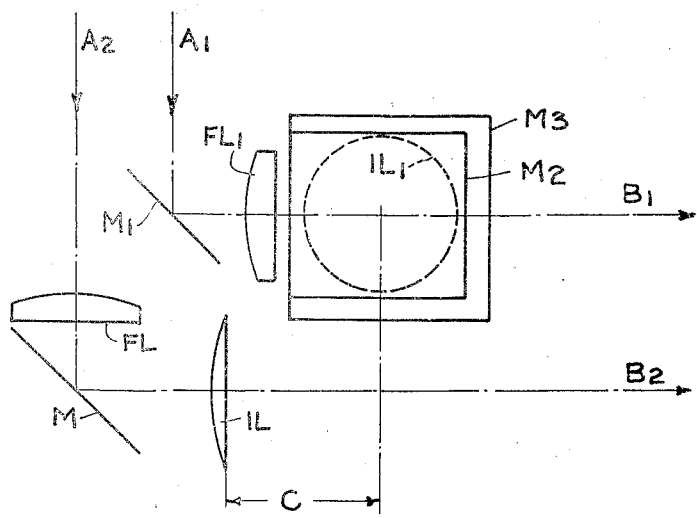
Figure 7:
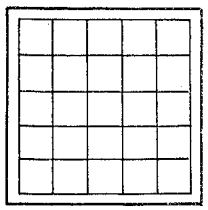
Figure 8:
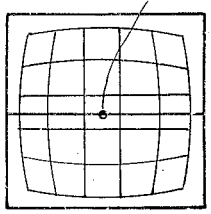
Figure 9:
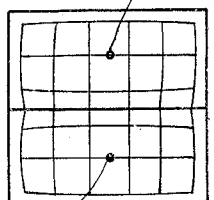

Means to reduce barrel shaped distortion are explained by means of Figs. 3, 4, 5, 6, 7, 8 and 9. Figs. 3 and 4, and 5 and 6, respectively, show two optical systems which are identical except for the disposition of the center lines of the lenses. Fig. 7 shows a schematic test object and Figs. 8 and 9 show how this object would appear in a finder of Figs. 3 and 4 and in another finder of Figs. 5 and 6, respectively.

Figs. 3, 4, 5 and 6 also serve to illustrate means to make the scale of reduction of both part images equal.

Figs. 10 and 11 show how a range finder of the type shown in Figs. 5 and 6 must be modified so that both part images show supplementing parts of the view finder image at the infinity position. Fig. 12 shows schematically a test object, and Fig. 13 shows how such object would appear in a finder of Figs. 10 and 11 illustrating a certain perspective error with which this finder is afflicted. Figs. 14 and 15 show an improvement of the finder of Figs. 10 and 11 by means of which this perspective error can be corrected. Figs. 10, 11, 12, 13, 14 and 15 refer generally to means to make both part images represent supplementary parts of the view finder image in the infinity position.

Figs. 16 and 17 show mechanical means to deviate one of the part images in order to bring both part images into register for range finding purposes. The geometry of this movement is further illustrated by diagrams shown in Figs. 18, 19 and 20. Figs. 17, 18, 19 and 20 illustrate means to bring part images into register.

Figs. 21, 22 and 23 show means to deviate one of the art images in order to make both part images at all times represent supplementing parts of the object to be photographed, these means to be effective at distances closer than infinity. Figs. 24, 25 and 26 show the schematic appearance of an object in the field of view of the finder and illustrate in particular the cooperation of a horizontal deviation of one part image for range finding purposes and a vertical deviation of the other image for obtaining correctly supplementing part images.

Fig. 27 shows schematically the preferred position of the camera lens with respect to the two range finder apertures in order to eliminate parallaxis. This figure illustrates means to compensate for parallaxis between range finder and camera lens.

Figure 28:
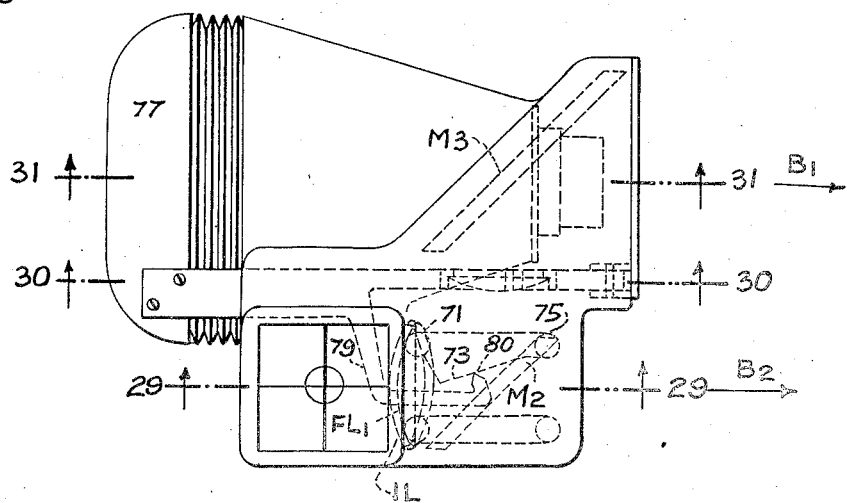

Figs. 28, 29, 30, 31 and 32 show an entire camera as equipped with a range finder of my invention. More particularly, Fig. 28 shows a plan view of the camera, Fig. 29 a cross-section along the plane of line 29—29 in Fig. 28, Fig. 30 a cross-section along the plane of line 30—30 in Fig. 28, Fig. 31 a cross-section along the plane of line 31—31 in Fig. 28, and Fig. 32 a front view of the camera. Figs. 33, 34, 35, 36 and 37 show the appearance of an object as seen in the finder, depending upon the position of the head of the observer with reference to the camera. Figs. 28, 29, 30, 31, 32, 33, 34, 35, 36 and 37 serve to illustrate the means to indicate proper eye position of the observer.

*Means to reduce the size of the reflecting surfaces*

In order to convert a view finder of the "brilliant" type into a range finder it is necessary to provide one system for either part image consisting of field lens, forwardly inclined image erecting mirror and image forming lens, plus means to transpose the beam of at least one part image system parallel to itself in order to obtain the necessary amount of parallaxis. The most practical way of doing this is by arranging two additional reflecting surfaces which are inclined by approximately 45° against the central ray and which are parallel to each other. Therefore, the optical system for at least one part image must comprise at least three mirrors, one to erect the image and two to transpose the beam. For the balance of this paragraph it will be more convenient to describe optical systems for one part image only, and methods to combine one or more of these part image systems into a complete range finder will be described later.

In the past, all proposed range finders of the "brilliant" type presented to the observer either a common field lens for both part images in a horizontal plane or two individal field lenses in adjacent positions, also in a horizontal plane as disclosed, for instance, in Patent #2,340,623, issued to me on February 1, 1944. In other words, the observer always looked first into the field lens and then into the rest of the optical system consisting of at least three mirrors and the image forming lens. The last four elements can be arranged in various ways. We can have, behind the field lens, first, the three mirrors and then the image forming lens, we can have two mirrors, the image forming lens and the third mirror, and we can have the first mirror, the image forming lens and the second and third mirrors.

The first possibility would be applicable to cameras equipped with telephoto lenses because otherwise the optical path between the image forming lens and the field lens would not be long enough to permit the insertion of three mirrors. The second possibility would still be used only for cameras equipped with fairly long focus lenses, roughly, of a focal length twice as long or longer than the width of a square picture. The third possibility would be applicable to cameras with lenses of ordinary focal length, i. e., between 1 and 1½ times the width of a square picture. However, both the second and third mirrors would then have to be inserted into a strongly divergent beam, and therefore, the third mirror would assume dimensions out of all reasonable proportions.

This difficulty is being overcome in my invention since I arrange an inclined mirror nearest to the observer, a field lens in a substantially vertical plane thereafter, and the rest of the optical system behind the field lens. For ordinary camera lenses the second mirror would be positioned behind the field lens, the image forming lens would be behind this second mirror and the third mirror would be behind the image forming lens. By these means the size of the mirrors can be very effectively reduced. The first mirror, i. e., the one nearest to the eyes of the observer is inserted into the relatively mildly divergent cone of rays between the field lens and the eyes of the observer. The second mirror is inserted into the constricted path of rays between the field lens and the image forming lens, and only the third mirror is positioned in front of the image forming lens where the beam of light is very strongly divergent. In spite of the strong divergence, however, the size of this third mirror need not be large since it is very close to the image forming lens.

Figure 1:
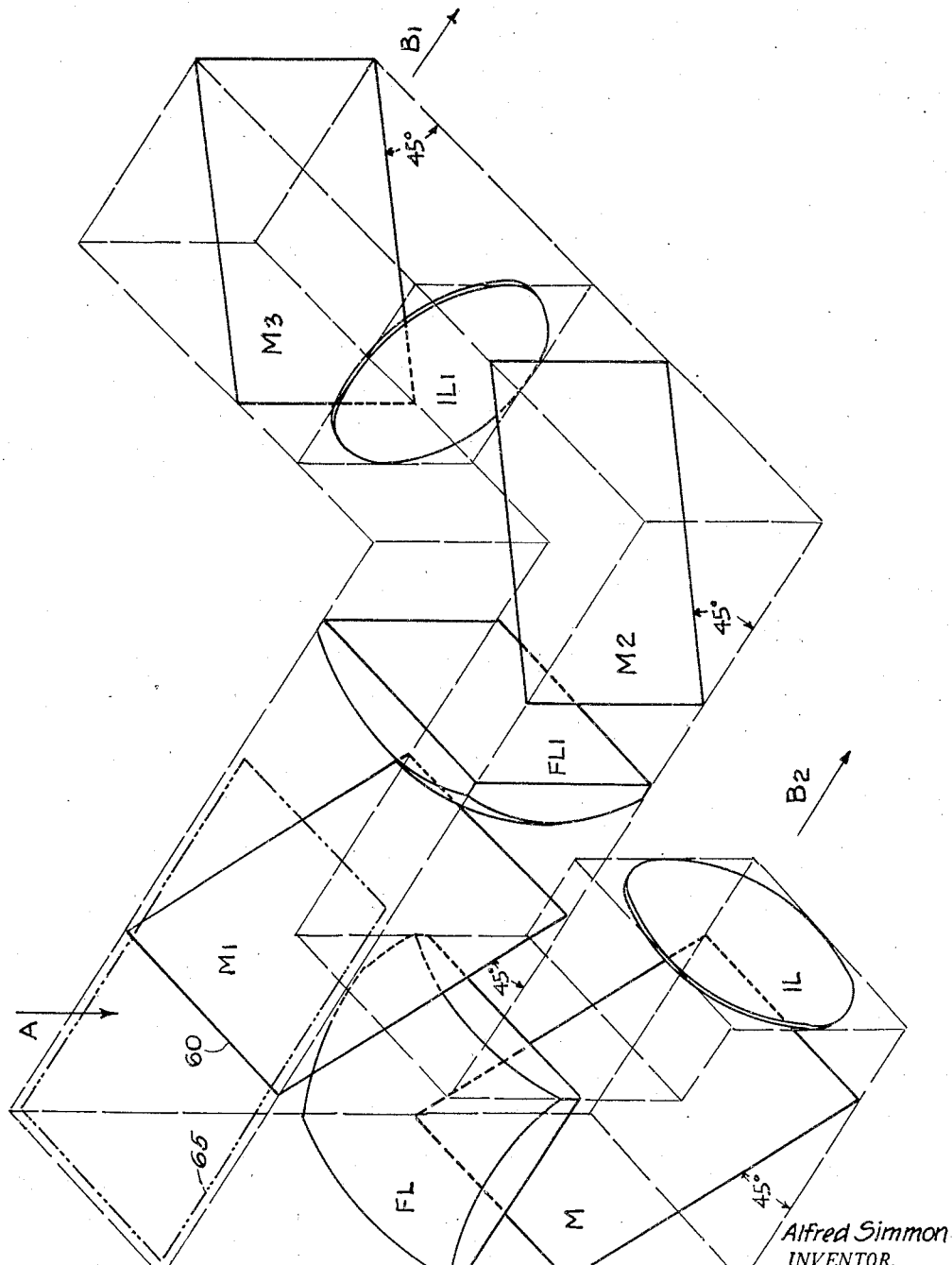
Fig. 1 shows schematically the optical system of a finder built according to this invention comprising two separate optical systems for the two part images, respectively.

A typical example of a system constructed accordingly is shown in Fig. 1. $M_1$ is the first inclined mirror into which the observer looks. $FL_1$ is the field lens of the first system, $M_2$ and $M_3$ are two parallel mirrors adapted to transpose the light beam parallel to itself, and $IL_1$ is the image forming lens of the first part image system. FL is the field lens, IL is the image forming lens of the second optical system, and M is a mirror intermediate to said two lenses.

*Means to provide a satisfactory parting line between part images*

The parting line between the two part images should be as nearly stationary as possible and independent of small movements of the observer's head and, if it does move at all, it should at least be seen by either eye at all times in substantially the same place with respect to the view finder image. This condition will be met by the optical system shown in Fig. 1, provided we utilize a slightly smaller image area than that really covered by the two field lenses. I have, therefore, shown in dotted lines a frame 65 which schematically indicates the area which should be used. This can be done in practice, for example, by limiting the aperture in the housing within which the entire system is contained to the size indicated by frame 65.

Figure 2:
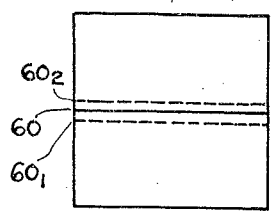
Fig. 2 illustrates the appearance of the parting line obtained with a finder of this general type.

If we assume that the head of the observer is centered with respect to the view finder image the range finder shown in Fig. 1 will appear to have the parting line 60 as shown in Fig. 2. If the observer moves his head sidewise this parting line will not move at all. If the observer moves the head forward in the direction of the arrow B the parting line will move slightly to the rear and assume the position called 60'. This movement is not particularly disturbing since the line moves parallel to itself and since this movement appears to be the same to either eye of the observer. Since mirror $M_1$ and the two field lenses are slightly larger than necessary no gap will appear between the two part images. In the same manner if the observer moves his head to the rear, the parting line will move forward a smaller distance into the position called 60'. This behavior is in practice quite satisfactory.

For systems of the type described, a satisfactory parting line can, therefore, be achieved by using the upper horizontal edge of the first reflecting surface of one of the part image systems.

*Means to reduce barrel-shaped distortion*

It is, of course, desirable to make the view finder image fairly large and also to make the projection of the image forming lens into the eye level plane of the observer as large as possible so that the observer has reasonable leeway to move his head and still be able to see the image with both eyes. The first condition calls, of course, for a large field lens and the second condition calls for an image forming lens of relatively large diameter plus a field lens of relatively short focus in order to render the projected image of the image forming lens large. For several reasons the application of highly corrected lenses is not feasible and, therefore, attempts to fulfill these conditions by using simple lenses only result in an image afflicted with appreciable aberrations. The quality of the image begins to deteriorate, particularly in the corners and the entire image is usually afflicted with a very pronounced barrel-shaped distortion which is rather unpleasant to look at. Fig. 7 shows a network of intersecting lines forming a number of squares representing schematically, for example, the front view of a building. An object of this type would be reproduced somewhat as shown in Fig. 8.

Figure 3:
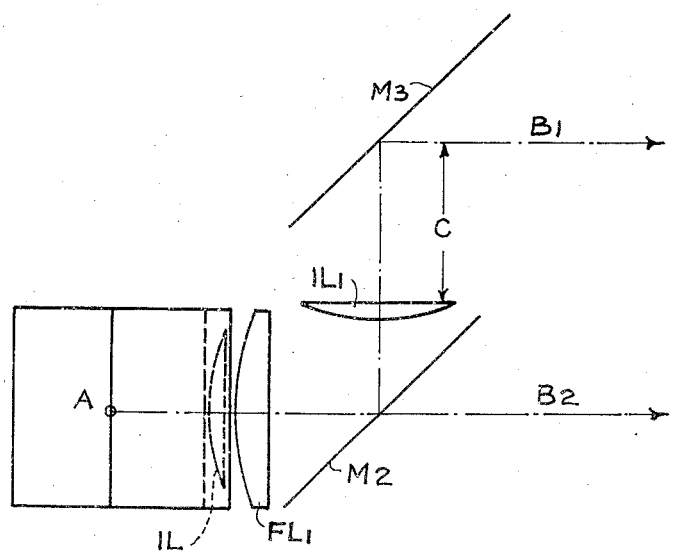
Figure 4:
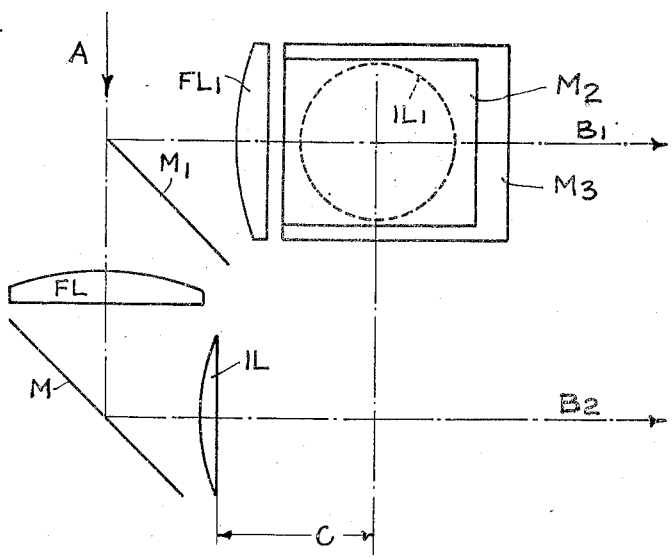

This defect can be very considerably reduced by proper choice of the center lines of the lenses forming the two part image systems. Figs. 3 and 4, as well as Figs. 5 and 6 illustrate this principle.

These figures show, respectively, plan views and elevations of a range finder constructed according to Fig. 1. As far as the arrangement of the reflecting surfaces is concerned, the two range finders shown in Figs. 3 and 4 and 5 and 6 are identical. They are, however, different with respect to the position of their lens center lines.

In Figs. 3 and 4 we see a narrow beam A passing the center of the entire view finder image, i. e., of the entire field composed of both part images. This narrow beam is split by mirror $M_1$, and one part is reflected forward into field lens $FL_1$, whereas the other part continues to travel downward into field lens FL. The first beam, after passing field lens $FL_1$ is reflected by mirror $M_2$ into image forming lens $IL_1$ and is then reflected forward again by mirror $M_3$. The second beam, after passing field lens FL is reflected by mirror M into image forming lens IL. The direction of the emerging pencils of light $B_1$ and $B_2$ is parallel to the optical center of the camera lens. It will be noted that the center lines of the four lenses of the two part image systems, respectively, are lined up on two center lines which are obtained by tracing through the reflector systems a small beam of light which passes the center of the entire view finder image.

Figs. 5 and 6 show a different arrangement. Here, we do not start with a pencil of light passing through a common center of the view finder image, but with two pencils of light, $A_1$ and $A_2$, passing through the two individual centers of the two part images respectively. As can be seen, beam $A_1$ is reflected by a mirror $M_1$ into field lens $FL_1$, mirror $M_2$, image forming lens $IL_1$ and mirror $M_3$, to emerge as a forwardly directed beam, $B_1$. The narrow pencil of light $A_2$ passes the center of the other part image, enters field lens FL, is reflected by mirror M into the image forming lens IL, and emerges as a forwardly directed beam $B_2$. The center lines on which the lenses of the two part image systems are aligned are, therefore, obtained by tracing through the respective part image reflecting systems, narrow pencils of light penetrating the individual centers of the two respective part images and not the common center of the entire view finder field.

The results can be seen in Figs. 8 and 9, respectively, with both lens systems aligned on a common center line as shown in Figs. 3 and 4, the view finder image is equivalent to the view finder image obtained with an ordinary "brilliant" type view finder, at least as far as distortion is concerned. This is shown in Fig. 8. The distortion, of course, is zero in center and becomes progressively worse towards the corners.

The distorted image obtained by the system of Figs. 5 and 6 is shown in Fig. 9. Here the distortion becomes a minimum along the center lines of each individual part image, i. e., $A_1$ and $A_2$. It again becomes progressively worse towards the corners, but the distortion is much less pronounced, because now we have not only reduced the size of each image appreciably but we have also shifted the centers of the individual distortions. In particular, a straight vertical line which is reproduced as a single curved line in Fig. 8 is now reproduced in Fig. 9 by two relatively short and relatively much less distorted lines which deviate from the ideal straight line only by a small fraction of the former deviation of the single curved line as shown in Fig. 8.

Barrel-shaped distortion can, therefore, be considerably reduced in finders of this type by aligning the lens systems of the two respective part image systems, not on a center line obtained by tracing through the respective reflector systems a pencil of light passing the common center of the entire view finder image, but by aligning them on individual center lines obtained by tracing through the individual reflector systems small pencils of light passing the individual centers of the two part image systems respectively.

*Means to make the scale of reduction for both part images equal*

Both part images must show supplementing parts of the object to be photographed and these supplementing parts must be reduced to exactly the same scale. This means:

1. The distance from the eyes of the observer to either field lens must be equal.
2. The two field lenses must be of the same focal length.
3. The distance between the two field lenses and the two image forming lenses, respectively, must be of the same length.
4. The distances from the image forming lens to the object to be photographed must be equal.

Almost all existing range finders meet the first three conditions, but the fourth has been frequently neglected, and as a matter of fact, the majority of the range finders now in use fail to meet this condition. It can be easily seen that unless these distances are equal, the scale of reduction for the two part images cannot possibly be the same, and a very considerable error will be introduced in this manner. For example, in some range finders one beam is almost 4" longer than the other beam, which means that at a distance of 3 ft., the scale of one part image will be more than 10% larger than the scale of the other one. If we focus with a range finder of this type, with a horizontal parting line, on a building having numerous vertical lines and with its front at right angles to the lens axis, we may obtain one distance by making these vertical lines coincide near the left margin of the frame, we may obtain a noticeably different distance if we make these vertical lines coincide near the middle of the picture, and we may obtain a still different distance if we make these lines coincide near the right margin of the picture. This effect is usually camouflaged by providing the finder with a larger field for view finding purposes and a very small field only for range finding purposes. This makes this effect less noticeable, but does not rectify the error at all.

Referring to our examples in Figs. 3 to 6, it can be seen that the first mirror $M_1$ is disposed in such a manner that the distances from the eyes of the observer to field lenses $FL_1$ and $FL$, respectively, are identical. In the same manner distances between field lenses and image forming lenses are the same for both part image systems, $FL_1$ to $IL_1 = FL$ to $IL$. It is, of course, assumed that the field lenses are of the same focal length, and that the image forming lenses are of the same focal length, but we still must make the distances from the two image forming lenses to the object to be photographed equal. Obviously this means that the distances marked C must be equal. This distance for the upper part image system represents the distance from the image forming lens to the third mirror, and for the lower part image system represents the length of the central ray from the image forming lens to a plane at right angles to the center line between the central ray and the third mirror of the upper part image system.

Therefore, in order to have the two part image systems reduce the two supplementary parts of the object to be photographed to the same scale, the distance traveled by the central ray of the upper part image system from the image forming lens to the third mirror must equal the distance traveled by the central ray of the lower part image system from the image forming lens to a plane at right angles to the center line of the camera lens and passing through the point of intersection between the central ray and the third mirror of the upper part image system.

*Means to make part images represent supplementing parts of the object to be photographed, infinity only*

The two part images shall at all times represent supplementing halves of the object to be photographed, but with most finder systems, different means have to be employed, depending upon whether the object is at infinity or relatively close to the camera. In this paragraph I shall discuss only those means necessary at the infinity position.

Means to make the two part images portray supplementing halves of the object in the infinity position differ again, depending upon the disposition of the lens center lines, i. e., as to whether the range finder is constructed according to Figs. 3 and 4, where all lenses are disposed on center lines obtained by tracing a narrow beam of light through the common center of the entire view finder image or whether the range finder is constructed according to Figs. 5 and 6, where all lenses are disposed on center lines which are obtained by tracing two pencils of rays through the individual centers of the two part images.

In the first case, my object is obtained automatically without any further modifications of the range finder, and the scheme shown in Figs. 3 and 4 will meet our requirements. The scheme shown in Figs. 5 and 6 needs some modification because, in the form that I show, the two part images will be almost identical, i. e., each one will show, for example, sky, horizon and foreground. In order to have the upper part image, for example, portray the sky down to horizon and the lower part image portray the foreground up to the horizon, one has to tilt the center lines of the beams $B_1$ and $B_2$ in the manner shown in Figs. 10 and 11 showing, respectively, a plan and an elevational view. The central ray of the upper part image should be tilted upwardly by an angle which equals one-quarter of the angle covered by the camera lens, and the central ray $B_2$ of the lower part image should be tilted downwardly by an equal amount. In this case the lower marginal ray of the upper beam and the upper marginal ray of the lower beam will both be horizontal and parallel to each other. Obviously, both systems will now portray supplementing parts of any infinitely far object. The mirrors $M_1$ and $M$ must, of course, now assume angles slightly larger or smaller, respectively, than the original 45° in order to reflect beams $B_1$ and $B_2$ into the desired directions.

An arrangement of this type will be satisfactory in portraying supplementing parts of the infinitely far object, but the range finder image will be afflicted by a noticeable error in perspective, which is schematically shown in Figs. 12 and 13. Fig. 12 shows a network of lines forming numerous squares, portraying diagrammatically, for example, a building. A range finder system of the type shown in Figs. 10 and 11 will not reproduce an object of this type correctly since one beam is directed slightly upwards and the other slightly downwards. The resulting part images are schematically shown in Fig. 13. The vertical lines which were originally parallel are now slightly converging towards a point far above the horizon for the upper part image, and towards a point far below the horizon for the lower part image. The result is that the upper part of the building seems to lean over backwards and the lower part of the building seems to lean over forwards.

This defect can be corrected by tilting the two field lenses FL and $FL_1$ in the manner shown in Figs. 14 and 15. As stated in the introduction, the image forming lens projects an image of the scene to be photographed substantially into the plane of the field lens, which means that the field lens does not magnify said image. This condition would prevail, for example, in Fig. 11. By tilting, for example, the field lens FL in the manner shown in Fig. 15 its right edge remains in the focal plane of the image forming lens IL, but the left edge assumes now a position farther removed from said image forming lens. The result of this is that the portions of the image near the right edge continue to receive no magnification, but that the portions of the image near the left edge are now being magnified to some extent. The portions near the right edge are those portions near the parting line as shown in Fig. 13. Their dimensions remain unchanged. The portions near the left edge of the field lens IL correspond to the portions of the image at the lower margin of the lower part image of Fig. 13 and these portions are now magnified. If the angle of the field lens is chosen correctly, this magnification of the image portions near the outer margins will offset the distortion seen in Fig. 13, and we will obtain the condition shown schematically in Fig. 12, where the distortion due to the downwardly inclined light beam is compensated for by this expedient. The upper part image, of course, is corrected in precisely the same manner, as shown in Fig. 15. This magnitude of the necessary angle can probably be deduced theoretically, but I have merely determined it empirically and have found that for average systems an angle of 8° or 9° is satisfactory.

*Means to bring part images into register*

There are two principal methods of moving one of the part images in order to bring it into register with the other one, i. e., either by tilting one of the mirrors or by shifting one of the lenses parallel to itself in a direction at right angles to its axis. Referring to Figs. 14 and 15, I could, for example, tilt mirror $M_3$ around the point of intersection with the central ray $B_1$. The method described in detail in Patent #2,303,767, issued to me on December 1, 1942, is fully applicable to this case.

One could also move lens $FL_1$ in a direction parallel to $B_1$. In this case, a construction very similar to the one outlined in my Patent #2,340,623 can be used. The third possibility, which I prefer for certain reasons, is to shift lens IL in a direction at right angles to $B_1$ and $B_2$, or referring to Fig. 15 at right angles to the plane of the drawing. Since the axis of lens IL is substantially parallel to the axis of the camera lens the construction given in my Patent #2,340,623 is not applicable here and I have devised the following construction:

This device is shown in Fig. 16 which shows a side view, and in Fig. 17 which shows a sectional view along the plane of line 17—17 in Fig. 19. The lens IL is mounted in a frame 70 which is equipped with two lugs 71. These lugs are fastened to pivots or shoulder screws 72 which, in turn, connect frame 70 to two parallel levers 73 and 74, respectively. These levers are rotatably fastened by shoulder screws 75 to the front part 76 of a camera housing. 77 is a camera back. The front part supports the camera lens 78 and the camera back 77 contains the sensitized film. The distance between these two parts is adjustable for focusing purposes and they are connected by an extensible, but light-tight, connection such as a bellows. It will be understood that Figs. 16 and 17 are more or less diagrammatical and that the various parts are not necessarily shown in their real proportions. For the sake of clarity all range finder parts with the exception of lens IL have been omitted.

As can be seen, a lever 73 is equipped with a straight cam surface 81, the extension of which passes through the center of pivot 75. A bracket 79 is fastened to the camera back, supporting a knife edge 80 which cooperates with the straight cam surface 81. The entire supporting structure for lens IL is biased by a little spring 82, so that cam surface 81 always presses against knife edge 80. It will be clear that, if the distance between the camera front 76 and the camera back 77 is increased in order to focus a closer distance, then lens IL will move parallel to itself in the direction shown by the arrow. It can be demonstrated that by choosing the angle of the straight cam surface 81 and the distance between points 75 and 80 properly, complete agreement between range finder coincidence and camera focusing can be obtained. Figs. 18, 19 and 20 will explain this:

Fig. 18 shows diagrammatically the two finder systems for the beams $B_1$ and $B_2$, the camera lens 78 and the beam deviating mechanism for lens IL. The reflecting systems for both part images have been temporarily omitted and the two image forming lenses $IL_1$ and IL and the two field lenses $FL_1$ and FL are shown in the position which they would assume without the reflectors. For reasons which will become apparent later, the optical system for beam $B_1$ is assumed to be arranged directly above the center line of the camera lens 78.

While these elements are shown in Fig. 18 as in the infinity position, they are shown in Fig. 19 as focused for a relatively close object. The various distances and angles are defined as follows:

$a$ is the distance of the object to be photographed from the optical center of the camera lens.

$b$ is the corresponding distance of the sensitized film from the optical center of the camera lens.

$F$ is the focal length of the camera lens. In Fig. 18, i. e., in the infinity position, there is, of course, $b=F$.

$\Delta F$ is the increment of the film-lens distance for close-ups. In other words, we have $b=F+\Delta F$.

$c$ is the distance by which the plane of the two field lenses would be disposed behind the optical center of the camera lens if one would omit the two reflecting systems.

$f$ is the focal length of the two image forming range finder lenses.

$m$ is the base distance of the range finder, i. e., the horizontal distance between the two beams $B_1$ and $B_2$ in the infinity position.

$i$ is the distance by which the lens IL must be shifted in order to bring the two part images into register.

$r$ is the length of lever 73 or 74.

$L$ is the distance between the pivot 75 of lever 73 and knife edge 80 in the infinity position.

$\alpha$ is the angle between beams $B_1$ and $B_2$ as focused for an object at the distance $a$.

$\beta$ is the angle, in the infinity position, between the straight cam surface 81 and a line passing pivot 75 parallel to the camera lens axis.

$j$ is the angle of rotation of levers 73 and 74 necessary in order to shift lens IL, the required distance $i$.

If, for focusing purposes, one increases the distance between the camera front and the camera back, point 80, i. e., the point of contact between the knife edge and the straight cam surface, in Fig. 18, will move to point $80^1$ in Fig. 19. Similarly, point 71 will move to point $71^1$, thereby shifting the lens IL by the required distance $i$.

Since the two reflecting systems are removed temporarily, the two part images are no longer seen in adjacent arrangement, but obviously the two part images would be in register as long as a point in the center of the camera field is projected by either image forming lens into the center of its respective field lens.

In the infinity position shown in Fig. 18 any point on the center line of the camera lens will be projected by either range finder lens into the center of field lenses $FL_1$ and FL, respectively. For close distances a point V on the camera lens axis, Fig. 19, will still be projected by lens $IL_1$ into the center of field lens $FL_1$ but lens IL will project the same object into a point disposed at a certain distance from the center of field lens FL. If one wants to restore the original condition, i. e., have point V projected into the center S of field lens FL, one has to shift image forming lens IL by the distance $i$ as shown in Fig. 19.

The two triangles RST and VSU are similar and, therefore, $$i:f=m:a+c, \text{ or } a=\frac{mf}{i}-c \qquad \text{(Equation 1)}$$

Points 75, 71 and $71^1$ and 80 and $80^1$ are shown at a somewhat enlarged scale in Fig. 20. A line is drawn at right angles to the extension of line 80—75 and the point of intersection is called 85. Triangle 75—80—$80^1$ gives us the following relations:

Distance $80^1$—$85=\Delta F \sin \beta$
Distance $80$—$85=\Delta F \cos \beta$
Distance $85$—$75=L+\Delta F \cos \beta$ $$\tan j=\frac{\Delta F \sin \beta}{L+\Delta F \cos \beta} \qquad \text{(Equation 2)}$$

Triangle 75—71—$71^1$ gives us the additional relation: $i=rj$ or, since $j$ is very small:

$$i=r \tan j \qquad \text{(Equation 3)}$$

These three equations can be transformed to read:

$$A \quad a=\frac{1}{\Delta F}\cdot\frac{fmL}{r \sin \beta}+\frac{fm}{r \tan \beta}-c \qquad \text{(Equation 4)}$$

$a$ can also be obtained from the equation of the camera lens:

$$\frac{1}{a}+\frac{1}{b}=\frac{1}{f}$$

or, since $b=F+\Delta F$ $$a=\frac{1}{\Delta F}F^2+F \qquad \text{(Equation 5)}$$

Equations 4 and 5 can be reconciled, if we make at all times $$F^2=\frac{fmL}{r \sin \beta} \text{ and } F=\frac{fm}{r \tan \beta}-c$$

$$\tan \beta=\frac{fm}{r(F+c)} \qquad \text{(Equation 6)}$$

$$L=\frac{F^2 r}{fm} \sin \beta \qquad \text{(Equation 7)}$$

*Means to make part images represent supplementing parts of the object to be photographed (near object)*

As can be seen in Figs. 14 and 15 the two beams $B_1$ and $B_2$ are not only displaced in the direction of the base distance $m$ of the range finder, horizontally in this case, but also in a direction at right angles to $m$, vertically, in this case; the amount of this displacement has been called $n$. While the displacement in the direction of $m$ is necessary for range finding purposes, the displacement in the direction of $n$ serves no useful purpose and should, therefore, be kept as small as possible. In some instances it is possible to reduce $n$ to zero, but generally this cannot be done without conflicting with the more important condition of equal beam lengths. The consequence is that a narrow strip, of the width $n$, of the object will not be shown by either of the part image systems. $n$ is usually no more than 2" and the omission of this narrow strip will, therefore, be unnoticeable as long as one deals with objects at or near infinity. For close-ups, however, this omission cannot be tolerated since, for example, focusing at the face of a person the mouth may be missing.

It becomes, therefore, necessary to introduce an additional beam deviating device which must be constructed in such a way that at least one of the beams is automatically tilted in the direction of $n$ in such a way that the lower marginal ray of the upper beam $B_1$ and the upper marginal ray of the beam $B_2$ intersect in the plane upon which the camera lens has been focused, i. e., the same plane which is portrayed by both part image systems in such a way that the two supplementing image halves are in register.

One may deviate either the upper or the lower beam, and one may again choose to do so either by tilting at least one mirror or by shifting at least one lens. I prefer to tilt the upper beam downward by shifting lens $IL_1$ vertically. This is shown in Fig. 21, where image forming lens $IL_1$ occupies a position noticeably lower than in Figs. 14 and 15 and where, consequently, beam $B_1$ is tilted downwardly in such a way that its lower marginal ray meets the upper marginal ray of beam $B_2$ at point 89. The central ray of beam $B_1$ is intercepted by mirror $M_3$ at point 90, reflected slightly upwardly, but almost at right angles to the plane of the drawing, meets lens $IL_1$ at point 91, mirror $M_2$ at point 92, and is here reflected into field lens $FL_1$.

The construction of the beam shifting device is shown in detail in Fig. 22, infinity, and 23, extreme close-up. The lens $IL_1$ is supported by a frame which is pivoted at point 97. This point is part of the camera front which also carries the camera lens. The frame is equipped with a straight cam surface 96, the extension of which passes point 97. This straight cam cooperates with knife edge 95 which is fastened to the camera back supporting the sensitized film. The vertical shift of the lens $IL_1$ has been called $i_1$, and in the infinity position Fig. 22, the center of lens $IL_1$ occupies a point $\frac{1}{2} i_1$ higher than point 97. During focusing the relative position of knife edge 95 changes with respect to the lens assembly as shown, with the result that the lens carrier rotates slightly and that in the extreme close-up position the center of lens $IL_1$ occupies a point $\frac{1}{2} i_1$ lower than point 97. It will be clear that the lens in this manner travels vertically by the distance $i_1$ between the infinity and the extreme close-up position and that, furthermore, the arc on which the lens center travels is not appreciably different from a straight line. The lens carrier is, of course, biased by a spring which is not shown and causes the carrier always to press against knife edge 95.

It can again be demonstrated that this device will deviate the upper beam $B_1$ by exactly the correct amount, if at all times one makes $$\tan \beta_1 = \frac{f \cdot n}{r_1(F+c)} \text{ and } L_1 = \frac{F^2 r_1}{f \cdot n} \sin \beta_1$$

The derivation of these formulas has been given in my Patent #2,340,623 and is also substantially identical with the derivation of the formulas for the beam deviating device employed for range finding purposes. It will, therefore, not be repeated here.

However, I wish to emphasize that, while the construction shown in Figs. 22 and 23 and the geometrical relations are identical with the construction and relations as disclosed in my Patent #2,340,623, the application is quite different because, whereas in that patent this construction was employed to deviate a beam for range finding purposes, it is employed here to tilt a beam in such a way that the two range finder part image systems always portray accurately supplementing parts of the object to be photographed, regardless of its distance from the camera and in spite of an unavoidable displacement between beams in a direction at right angles to the range finder base.

The result of the cooperation of the two beam deviating devices, vertical deviation of $B_1$ to make part images supplementary and horizontal deviation of $B_2$ for range finding purposes, has been shown schematically in Figs. 24, 25 and 26.

If one assumes that beams $B_1$ and $B_2$ are parallel, as shown in Figs. 14 and 15, an infinitely far distant object will be seen as shown in Fig. 26. The same object at a closer distance will appear as shown in Fig. 24, i. e., the lower part image will be displaced horizontally towards the right and the upper part image will be incomplete, i. e., a strip of the width $n$ will be missing. Deviating the beam $B_2$ horizontally by means of the mechanism shown in Figs. 16 and 17, will shift the lower image towards the left and vertical lines will now be in register as shown in Fig. 25. However, the upper part image will still be incomplete. The original appearance of the object will, however, be restored by shifting beam $B_1$ vertically downwardly by the mechanism shown in Figs. 22 and 23, and the object will now appear complete and its two halves in register as shown in Fig. 26.

In reality, the two beam deviating devices will, of course, work simultaneously.

Means to compensate for parallaxis between the range finder and camera lens

The two spaced beams of the range finder are by necessity displaced with respect to the beam emanating from the camera lens. The fields covered by the camera lens and the range finder, respectively, show, therefore, a small but by no means negligible discrepancy. Numerous proposals have been made to compensate for this difference, for example, by means of sliding, cam actuated, masks in the plane of the view finder image. Many of these proposed means are, of course, applicable to my range finder.

Figure 29:
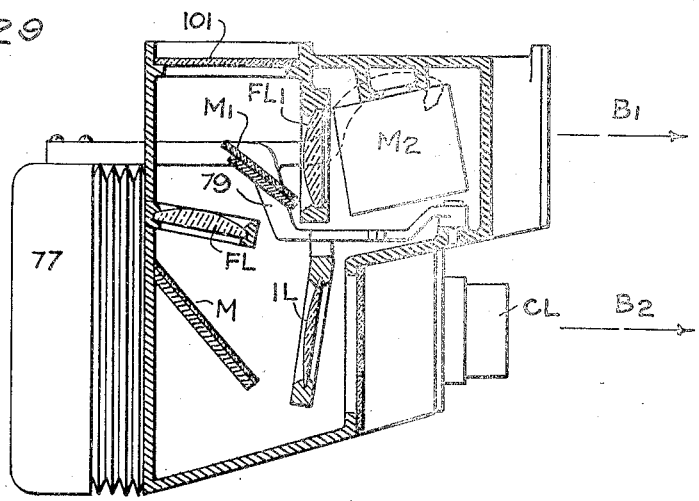
Figure 32:
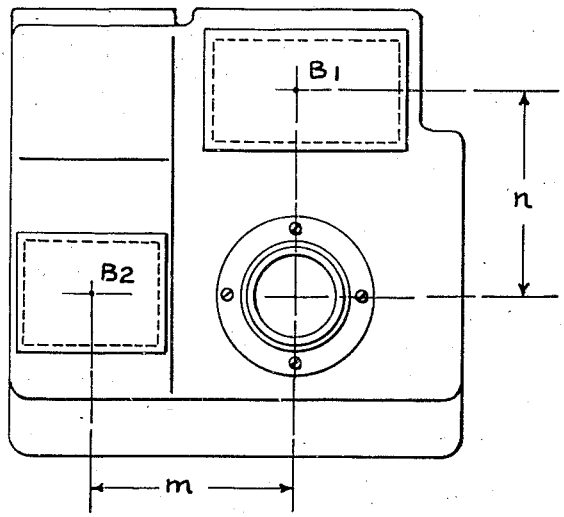

However, in the case of a range finder such as shown in Figs. 14 and 15, it can be shown that the effect of the parallaxis can be eliminated without the introduction of additional mechanical means merely by a judicious choice of the location of the camera lens with respect to the range finder. A plan view of a camera, thus constructed, is shown in Fig. 28, while Figs. 29, 30 and 31 show, respectively, sectional views along the planes of lines 29, 30 and 31 in Fig. 28. Fig. 32 shows a front view of the camera, facing the camera lens.

As can be seen, the camera lens CL is disposed vertically below beam $B_1$ and on the same horizontal level as the other beam $B_2$.

The three light beams, i. e., the camera lens beam and the two range finder beams $B_1$ and $B_2$ are again shown schematically in Fig. 27. It will be clear that beam $B_1$ is inherently free from horizontal parallaxis with respect to the field covered by the camera lens, since during focusing the beam deviating mechanism shown in Figs. 22 and 23 merely makes the beam $B_1$ perform a slight vertical sweep. It will also be clear that beam $B_2$ is always inherently free from vertical parallaxis with respect to the field covered by the camera lens since the beam deviating mechanism shown in Figs. 16 and 17 merely makes the beam perform a horizontal sweep for range finding purposes. It will, furthermore, be clear that if the two beam deviating devices are adjusted properly, the vertical parallaxis of beam $B_1$ will be eliminated by the beam deviating mechanism shown in Figs. 22 and 23, and that the horizontal parallaxis of beam $B_2$ will be eliminated by the beam deviating mechanism in Figs. 16 and 17. In other words, one has the picture, shown in Fig. 27, where beams $B_1$ and $B_2$ supplement each other and cover substantially the same field as covered by the camera lens.

Means to indicate proper eye position of observer

It has been explained in the introduction that a range finder of the "brilliant" type projects an enlarged image of the image forming lens into the eye level plane of the observer. As long as both eyes of the observer stay within the area covered by this lens image, the observer is able to see the range finder image simultaneously with both eyes. If the range finder is properly designed, the observer has some leeway to move his head within this area, but it is, nevertheless, desirable to give him some indicator so that he can judge whether his eyes are centered with respect to the view finder image with a sufficient degree of accuracy. Attempts have been made in the past to solve this problem by providing an eye piece, with or without an additional magnifier lens, at some distance above the field lens of the finder. This is not a very good solution because then the observer can not ordinarily use both eyes, and one of the main advantages of the "brilliant" finder, i. e., the relative freedom of the observer's head, becomes lost. I have, therefore, devised the following means to obtain the desired result:

With reference to Figs. 28 to 32, the entire finder is, of course, contained in a suitably shaped housing, various cross-sections of which can be seen in the Figs. 29, 30 and 31. This housing must, by necessity, have three apertures, one for either beam, and one to permit the observer to look into the optical system. It is expedient to close these windows by transparent plates made from glass or other suitable material. The upper window into which the observer looks is designated as 101. On this window I inscribe a line representing a circle, or at any rate a closed figure; it may be a square or an ellipsis. The observer will then see this circle superimposed upon the parting line of the range finder. In the middle of this parting line I provide a mark, for example, by cementing a small tab onto mirror $M_1$. It is also possible to inscribe vertical center lines on the two field lenses $FL_1$ and $FL$ in place of this mark. The result is that the observer will either see the parting line with the mark within the circle inscribed on window 101, or he will see a cross formed by the parting line and the vertical lines on the two field lenses within this circle. This is shown schematically in Figs. 33 and 34.

Figure 33:
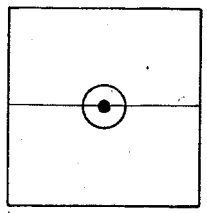
Figure 34:
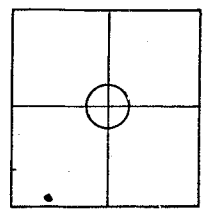
Figure 35:
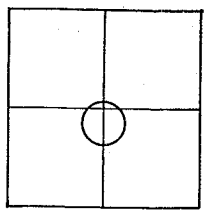
Figure 36:
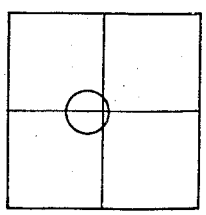
Figure 37:
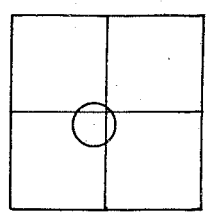

As long as the head of the observer is perfectly centered, he will see the image as shown in Figs. 33 and 34, i. e., exactly in the center of the circle. If the observer moves his head sideways, the circle will appear horizontally displaced, as shown in Fig. 35. If he moves his head forward, it will appear vertically displaced, as shown in Fig. 36, and a combination of both movements will make the cross assume some corresponding position, Fig. 37. It is easily possible to choose the diameter of the circle, or the magnitude of any other figure such as a square or an ellipsis, with reference to the distance of the window 101 from mirror $M_1$ or field lens $FL_1$ or $FL$, so that no undue effects become apparent as long as the center mark still appears within the circle of the window. In other words, as long as the mark is still within the area of the circle, the view finder picture does not begin to be cut off at the corners, and aberrations and distortions will not become unduly large.

A cross composed of the horizontal parting line and vertical lines inscribed on the two field lenses has certain advantages over a simple mark in the center of the parting line, because the distance from the window 101 to the parting line is smaller than the distance from the window to the vertical line inscribed on the field lenses. Therefore, a lateral movement of the observer's head will displace the circle on the window more than a corresponding forward or backward movement. This is desirable because the two eyes can move only a small distance sideways until one eye leaves the area covered by the projected image of the image forming lens, but the eyes may move a relatively large distance forward or back and still remain within this area. The differential sensitivity offered by this arrangement is, therefore, advantageous.

I have found that a device of this type is very useful and that, after a short while, the operator keeps his head within the proper area practically automatically and without conscious effort, and in this respect this device is much superior to other means proposed heretofore.

While I have shown in the drawings diagrammatically preferred embodiments of the invention, it is obvious that many modifications may be made in the instrumentalities disclosed without departing from the principles or sacrificing any of the advantages of the invention as defined in the appended claims.

What I claim as new is:

1. In a camera with a focusable lens, a range finder of the split-image, brilliant type comprising a supporting structure, a first optical system for one part image and a second optical system for the other part image, both systems in cooperative relation with each other, the first system including a first reflector into which the observer looks, which is closer to the observer's eye than any other optical element and which is inclined by substantially 45° against the substantially vertical line of vision, a first positive field lens, a second reflector, a first positive image forming lens, and a third reflector, these five elements arranged in that order and so disposed within said supporting structure that the first image forming lens forms a real image of one part of the object to be photographed substantially in the plane of said first field lens, the second system including a second field lens, a fourth reflector, and a second image forming lens, these three elements arranged in that order and so disposed within said supporting structure that the second image forming lens forms a real image of another part of said object substantially in the plane of said second field lens, the two part image system so arranged within said supporting structure as to depict to the observer substantially supplementary parts of said object, in apparently adjacent relationship, and means to shift the part image formed by one optical system into register with the part image formed by the other optical system, the magnitude of said shift being indicative of the distance of said object from the camera.

2. A range finder according to claim 1, said last mentioned means comprising mechanism to shift one of the image forming lenses parallel to itself and in a direction at right angles to its optical axis in coordination with the focusing movement of the camera lens.

3. A range finder according to claim 1, said first positive field lens arranged in a substantially vertical plane in front of said inclined first reflector.

4. A range finder according to claim 1, said first reflector being forwardly inclined and reflecting the substantially vertical line of vision in a forward direction substantially parallel to the axis of the camera lens, and said first field lens arranged in front of said first reflector in a substantially vertical plane substantially perpendicular to the axis of the camera lens.

5. A range finder according to claim 1, said first reflector being forwardly inclined and reflecting the substantially vertical line of vision in a forward direction substantially parallel to the axis of the camera lens, said first field lens arranged in front of said first reflector in a substantially vertical plane substantially at right angles to the axis of the camera lens, said second reflector arranged in front of said field lens in a substantially vertical plane, forming an angle of substantially 45° with the axis of the camera lens and with the now forwardly directed line of vision, reflecting it into a lateral, substantially horizontal direction, said first image forming lens arranged in front of said second reflector in a plane which is substantially vertical and parallel to the axis of the camera lens, said third reflector arranged in front of said first image forming lens in a plane substantially parallel to said second reflector and reflecting the line of vision forwardly again in a substantially horizontal direction substantially parallel to the axis of the camera lens.

6. A range finder according to claim 1, said second field lens arranged in a substantially horizontal plane at a lower level than said first reflector.

7. A range finder according to claim 1, said second field lens arranged in a substantially horizontal plane at a lower level than said first reflector, said fourth reflector being forwardly inclined underneath said second field lens, forming an angle of substantially 45° with the vertical line of vision and reflecting it forwardly in a substantially horizontal direction substantially parallel to the axis of the camera lens, and said second image forming lens in front of said fourth reflector and in a substantially vertical plane substantially perpendicular to the axis of the camera lens.

8. A range finder according to claim 1, said first reflector being forwardly inclined and reflecting the substantially vertical line of vision in a forward direction substantially parallel to the axis of the camera lens, said first field lens arranged in front of said first reflector in a substantially vertical plane substantially at right angles to the axis of the camera lens, said second reflector arranged in front of said field lens in a substantially vertical plane, forming an angle of substantially 45° with the axis of the camera lens and with the now forwardly directed line of vision, reflecting it into a lateral, substantially horizontal direction, said first image forming lens arranged in front of said second reflector in a plane which is substantially vertical and parallel to the axis of the camera lens, said third reflector arranged in front of said first image forming lens in a plane substantially parallel to said second reflector and reflecting the line of vision forwardly again in a substantially horizontal direction substantially parallel to the axis of the camera lens, said second field lens arranged in a substantially horizontal plane at a lower level than said first reflector, said fourth reflector being forwardly inclined underneath said second field lens, forming an angle of substantially 45° with the vertical line of vision and reflecting it forwardly in a substantially horizontal direction substantially parallel to the axis of the camera lens, and said second image forming lens in front of said fourth reflector and in a substantially vertical plane substantially perpendicular to the axis of the camera lens.

9. In a camera with a focusable lens, a range finder of the split-image, brilliant type comprising a supporting structure, a first optical system for one part image and a second optical system for the other part image, both systems in cooperative relation with each other, the first system including a first reflector into which the observer looks, which is closer to the observer's eye than any other optical element and which is inclined by substantially 45° against the substantially vertical line of vision, a first positive field lens, a second reflector, a first positive image forming lens, and a third reflector, these five elements arranged in that order and so disposed within said supporting structure that the first image forming lens forms a real image of one part of the object to be photographed substantially in the plane of said first field lens, the second system including a second field lens, a reflector, and a second image forming lens, these three elements arranged in that order and so disposed within said supporting structure that the second image forming lens forms a real image of another part of said object substantially in the plane of said second field lens, the two part image system so arranged within said supporting structure as to depict to the observer substantially supplementary parts of said object, in apparently adjacent relationship, and means to shift the part image formed by one optical system into register with the part image formed by the other optical system, the magnitude of said shift being indicative of the distance of said object from the camera, part of the boundary of said first reflector forming the parting line between the two part images.

10. A range finder according to claim 9, the boundary of said first reflector comprising at least one straight line which forms said parting line.

11. A range finder according to claim 9, the boundary of said first reflector comprising at least one straight line which forms said parting line and which is arranged in a substantially horizontal plane.

12. A range finder according to claim 9, the boundary of said first reflector comprising at least one straight line which forms said parting line, said straight line being the intersection of a substantially horizontal plane parallel to the axis of the camera lens, and a substantially vertical plane perpendicular to the axis of said lens.

13. In a camera with a focusable lens, a range finder of the split-image, brilliant type comprising a supporting structure, a first optical system for one part image and a second optical system for the other part image, both systems in cooperative relation with each other, the first system including a first reflector into which the observer looks, which is closer to the observer's eye than any other optical element and which is inclined by substantially 45° against the substantially vertical line of vision, a first positive field lens, a second reflector, a first positive image forming lens, and a third reflector, these five elements arranged in that order and so disposed within said supporting structure that the first image forming lens forms a real image of one part of the object to be photographed substantially in the plane of said first field lens, the second system including a second field lens, a fourth reflector, and a second image forming lens, these three elements arranged in that order and so disposed within said supporting structure that the second image forming lens forms a real image of another part of said object substantially in the plane of said second field lens, the two part image system so arranged within said supporting structure as to depict to the observer substantially supplementary parts of said object, in apparently adjacent relationship, and means to shift the part image formed by one optical system into register with the part image formed by the other optical system, the magnitude of said shift being indicative of the distance of said object from the camera, the centers of said two field lenses coinciding with the centers of their respective part images.

14. A range finder built according to claim 13, the central rays of the two part image systems passing through the centers of said two image forming lenses, and after being reflected by the respective reflector intermediate the field lens and image forming lens of either of the two optical systems, passing through the center of their respective part images.

15. In a camera with a focusable lens, a range finder of the split-image, brilliant type comprising a supporting structure, a first optical system for one part image and a second optical system for the other part image, both systems in cooperative relation with each other, the first system including a first reflector into which the observer looks, which is closer to the observer's eye than any other optical element and which is inclined by substantially 45° against the substantially vertical line of vision, a first positive field lens, a second reflector, a first positive image forming lens, and a third reflector, these five elements arranged in that order and so disposed within said supporting structure that the first image forming lens forms a real image of one part of the object to be photographed substantially in the plane of said first field lens, the second system including a second field lens, a fourth reflector, and a second image forming lens, these three elements arranged in that order and so disposed within said supporting structure that the second image forming lens forms a real image of another part of said object substantially in the plane of said second field lens, the two part image system so arranged within said supporting structure as to depict to the observer substantially supplementary parts of said object, in apparently adjacent relationship, and means to shift the part image formed by one optical system into register with the part image formed by the other optical system, the magnitude of said shift being indicative of the distance of said object from the camera, said two field lenses being of equal focal length, said two image forming lenses being of equal focal length, and the optical distance between either field and image forming lens being substantially equal to the focal length of said image forming lens.

16. A range finder according to claim 15, the length of the central ray of said first part image system, consisting of the distance from the object to be photographed to said third reflector plus the distance from said third reflector to said first image forming lens, being equal to the length of the central ray of said second part image system from the object to be photographed to said second image forming lens.

17. A range finder according to claim 15, the length of the central ray of said first part image system, consisting of the distance from the eyes of the observer to said first reflector plus the distance from said first reflector to said first field lens, being equal to the length of the central ray of said second part image system from the eyes of the observer to said second field lens.

18. A range finder according to claim 15, the length of the central ray of said first part image system, consisting of the distance from the object to be photographed to said third reflector plus the distance from said third reflector to said first image forming lens, being equal to the length of the central ray of said second part image system from the object to be photographed to said second image forming lens, and the length of the central ray of said first part image system, consisting of the distance from the eyes of the observer to said first reflector plus the distance from said first reflector to said first field lens, being equal to the length of the central ray of said second part image system from the eyes of the observer to said second field lens.

19. In a camera with a focusable lens, a range finder of the split-image, brilliant type comprising a supporting structure, a first optical system for one part image and a second optical system for the other part image, both systems in cooperative relation with each other, the first system including a first reflector into which the observer looks, which is closer to the observer's eye than any other optical element and which is inclined by substantially 45° against the substantially vertical line of vision, a first positive field lens, a second reflector, a first positive image forming lens, and a third reflector, these five elements arranged in that order and so disposed within said supporting structure that the first image forming lens forms a real image of one part of the object to be photographed substantially in the plane of said first field lens, the second system including a second field lens, a fourth reflector, and a second image forming lens, these three elements arranged in that order and so disposed within said supporting structure that the second image forming lens forms a real image of another part of said object substantially in the plane of said second field lens, the two part image system so arranged within said supporting structure as to depict to the observer substantially supplementary parts of said object, in apparently adjacent relationship, means to shift the part image formed by one optical system into register with the part image formed by the other optical system, the magnitude of said shift being indicative of the distance of said object from the camera, and means to make the light beam of one of said optical systems emerge from the range finder in a forward and slightly upwardly inclined direction, and means to make the light beam of the other of said optical systems emerge from the range finder in a forward and slightly downwardly inclined direction, both beams thereby covering supplementing parts of the finder image.

20. A range finder according to claim 19, said last mentioned means comprising the arrangement of said first reflector in a forwardly inclined plane forming an angle of $$45° + \frac{\alpha}{8}$$

with the substantially vertical line of vision, $\alpha$ being the angle covered by the camera lens, said first reflector thereby reflecting the line of vision in a forward and slightly upward direction forming an angle of $$\frac{\alpha}{4}$$

with a horizontal plane parallel to the axis of the camera lens, and the arrangement, underneath said second field lens, of said fourth reflector in a forwardly inclined plane forming an angle of $$45° - \frac{\alpha}{8}$$

with the substantially vertical line of vision, thereby reflecting it in a forward and slightly downward direction forming an angle of $$\frac{\alpha}{4}$$

with a horizontal plane parallel to the axis of the camera lens.

21. A range finder according to claim 19, the central ray of either part image system passing through the centers of its respective field and image forming lenses, the optical axis of said field lens being inclined against said central ray, the optical distance from each image forming lens to that portion of its field lens portraying portions of the part image near the parting line being substantially equal to the focal length of said image forming lens, and the optical distance from each image forming lens to that portion of its field lens portraying portions of the part image far away from the parting line and near the outer margins of said part image being larger than the focal length of said image forming lens, whereby the portions of the part image near the parting line receive substantially no magnification, but the portions far away from the parting line receive sufficient magnification to compensate for the perspective distortion introduced by the upwardly or downwardly inclined direction of the two light beams forming the two part image systems.

22. In a camera comprising two main camera parts in adjustable relation, a camera lens supported by one of said parts, and sensitized film by the other of said parts, a range finder of the split-image, brilliant type comprising a supporting structure, a first optical system for one part image and a second optical system for the other part image, both systems in cooperative relation with each other, the first system including a first reflector into which the observer looks, which is closer to the observer's eye than any other optical element and which is inclined by substantially 45° against the substantially vertical line of vision, a first positive field lens, a second reflector, a first positive image forming lens, and a third reflector, these five elements arranged in that order and so disposed within said supporting structure that the first image forming lens forms a real image of one part of the object to be photographed substantially in the plane of said first field lens, the second system including a second field lens, a fourth reflector, and a second image forming lens, these three elements arranged in that order and so disposed within said supporting structure that the second image forming lens forms a real image of another part of said object substantially in the plane of said second field lens, the two part image system so arranged within said supporting structure as to depict to the observer substantially supplementary parts of said object, in apparently adjacent relationship, and a beam deviating device including means to shift the part image formed by one optical system into register with the part image formed by the other optical system, the magnitude of said shift being indicative of the distance of said object from the camera, said last mentioned means including a frame for one of said image forming lenses, a lug at each side of said frame, two parallel levers of equal length, each lever being pivotally secured to one of said lugs with one of its ends, the other end of each lever being pivotally connected to one of said main camera parts, one of said levers being provided with a straight cam surface, the extension of which passes through the center of its pivotal connection to said camera part, and a member with a knife edge fixedly secured to said other main camera part, said knife edge adapted to cooperate with said straight cam surface.

23. In a camera according to claim 22, the dimensions of the beam deviating device as given by the two formulae:

$$\tang \beta = \frac{f.m}{r.(F+C)}$$

$$L = \frac{F^2 r}{fm} \sin \beta$$

Where

F is the focal length of the camera lens,
L is the length of the straight cam surface between the bearing of the cam supporting lever and the knife edge, in the infinity position,
$\beta$ is the angle in the infinity position between the straight cam surface and a line parallel to the camera lens axis passing said lever bearing,
$f$ is the focal length of the image forming lens of the range finder,
$r$ is the length of either parallel lever supporting the frame of the image forming lens,
C is the distance by which the plane of the finder image would be positioned behind the optical center of the camera lens, if the reflecting system would be temporarily omitted, and
$m$ is the base distance of the range finder.

24. In a camera comprising two main camera parts in adjustable relation, a camera lens supported by one of said parts, and sensitized film by the other of said parts, a range finder of the split-image, brilliant type comprising a supporting structure, a first optical system for one part image and a second optical system for the other part image, both systems in cooperative relation with each other, the first system including a first reflector into which the observer looks, which is closer to the observer's eye than any other optical element and which is inclined by substantially 45° against the substantially vertical line of vision, a first positive field lens, a second reflector, a first positive image forming lens, and a third reflector, these five elements arranged in that order and so disposed within said supporting structure that the first image forming lens forms a real image of one part of the object to be photographed substantially in the plane of said first field lens, the second system including a second field lens, a fourth reflector, and a second image forming lens, these three elements arranged in that order and so disposed within said supporting structure that the second image forming lens forms a real image of another part of said object substantially in the plane of said second field lens, means to deviate the beam of one part image system in order to make the two part images represent at all distances a complete finder image composed of two supplementing halves of the object to be photographed, and means to deviate the beam of the other part image system in order to bring these supplementing parts of the finder image into register for range finding purposes, the second beam being deviated in a direction perpendicular to the direction in which the first beam is being deviated.

25. A camera according to claim 24, said first mentioned beam deviating means including mechanism to shift one of the image forming lenses parallel to itself in a direction perpendicular to its optical axis.

26. A camera according to claim 24, said first mentioned beam deviating means including a frame for one of the image forming lenses, said frame having a pivot fastened to one of said main camera parts and the pivot axis being parallel to the axis of the image forming lens within the frame, said frame having a straight cam surface the extension of which passes through the center of said pivot, said straight cam surface being in cooperative contact with a knife edge fastened to the other main camera part.

27. In a camera with a housing, a focusable lens, a range finder of the split-image, brilliant type comprising a supporting structure, a first optical system for one part image and a second optical system for the other part image, both systems in cooperative relation with each other, the first system including a first reflector into which the observer looks, which is closer to the observer's eye than any other optical element and which is inclined by substantially 45° against the substantially vertical line of vision, a first positive field lens, a second reflector, a first positive image forming lens, and a third reflector, these five elements arranged in that order and so disposed within said supporting structure that the first image forming lens forms a real image of one part of the object to be photographed substantially in the plane of said first field lens, the second system including a second field lens, a fourth reflector, and a second image forming lens, these three elements arranged in that order and so disposed within said supporting structure that the second image lens forms a real image of another part of said object substantially in the plane of said second field lens, means to deviate the beam of one part image system in order to make the two part images represent at all distances a complete finder image composed of two supplementing halves of the object to be photographed, and means to deviate the beam of the other part image system in order to bring these supplementing parts of the finder image into register for range finding purposes, one beam being deviated in a substantially horizontal and the other in a substantially vertical plane, the center line of the camera lens arranged substantially at the line of intersection of these two planes.

28. A camera according to claim 27, the front wall of said camera housing having two apertures for the two light beams of the two respective part image systems, the camera lens being arranged vertically below one of said apertures and at the same horizontal level as the other of said apertures.

29. In a camera with a housing, a focusable lens, a range finder of the split-image, brilliant type comprising a supporting structure, a first optical system for one part image, and a second optical system for the other part image, both systems in cooperative relation with each other, the first system including a first reflector into which the observer looks, which is closer to the observer's eye than any other optical element and which is inclined by substantially 45° against the substantially vertical line of vision, a first positive field lens, a second reflector, a first positive image forming lens, and a third reflector, these five elements arranged in that order and so disposed within said supporting structure that the first image forming lens forms a real image of one part of the object to be photographed substantially in the plane of said first field lens, the second system including a second field lens, a fourth reflector, and a second image forming lens, these three elements arranged in that order and so disposed within said supporting structure that the second image forming lens forms a real image of another part of said object substantially in the plane of said second field lens, the two part image system so arranged within said supporting structure as to depict to the observer substantially supplementary parts of said object, in apparently adjacent relationship, means to shift the part image formed by one optical system into register with the part image formed by the other optical system, the magnitude of said shift being indicative of the distance of said object from the camera, the topwall of said camera housing having an aperture through which the observer sees the two part images, a transparent plate with a closed figure inscribed thereon covering said aperture, part of the boundary of said first reflector forming the parting line between the two part images, and a mark substantially in the center of said parting line and, if within said closed figure on said cover, indicating to the observer that his eyes are substantially in the proper position with respect to the range finder.

30. A camera according to claim 29, the boundary of said first reflector comprising at least one straight line which forms the parting line between the two part images, and lines inscribed substantially in the center of both field lenses, these lines appearing to the observer to form a continuous straight line at right angles to said parting line and forming a cross therewith, said cross and said closed figure on the cover cooperating to serve as an indicator for the correct eye position of the observer with respect to the range finder.

ALFRED SIMMON.

REFERENCES CITED

The following references are of record in the file of this patent:

UNITED STATES PATENTS

| Number | Name | Date |
|---|---|---|
| 2,106,622 | Pritschow et al. | Jan. 25, 1938 |
| 2,165,402 | Mihalyi | Jan. 11, 1939 |
| 2,186,615 | Mihalyi | Jan. 9, 1940 |
| 2,153,813 | Pritschow | Apr. 11, 1939 |
| 1,849,308 | Mihayli | Mar. 15, 1932 |
| 1,582,944 | Turk | May 4, 1926 |
| 2,153,198 | Mihalyi | Apr. 4, 1936 |

FOREIGN PATENTS

| Number | Country | Date |
|---|---|---|
| 441,302 | British | Jan. 16, 1936 |